(12) United States Patent
Okamoto et al.

(10) Patent No.: US 11,220,985 B2
(45) Date of Patent: Jan. 11, 2022

(54) HOLLOW COMPOSITE MAGNETIC MEMBER, PROCESS FOR PRODUCING SAME, AND FUEL EJECTION VALVE

(71) Applicant: Hitachi Automotive Systems, Ltd., Hitachinaka (JP)

(72) Inventors: Shinya Okamoto, Tokyo (JP); Xudong Zhang, Tokyo (JP); Nobuaki Kobayashi, Hitachinaka (JP); Takahiro Saito, Hitachinaka (JP); Akihiro Yamazaki, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 510 days.

(21) Appl. No.: 15/741,128

(22) PCT Filed: Jun. 9, 2016

(86) PCT No.: PCT/JP2016/067169
§ 371 (c)(1),
(2) Date: Dec. 29, 2017

(87) PCT Pub. No.: WO2017/006692
PCT Pub. Date: Jan. 12, 2017

(65) Prior Publication Data
US 2018/0187636 A1    Jul. 5, 2018

(30) Foreign Application Priority Data

Jul. 7, 2015  (JP) .............................. JP2015-135990

(51) Int. Cl.
*H01F 1/147*        (2006.01)
*F02M 51/06*        (2006.01)
(Continued)

(52) U.S. Cl.
CPC ..... *F02M 51/0625* (2013.01); *B23K 15/0086* (2013.01); *B23K 26/0006* (2013.01);
(Continued)

(58) Field of Classification Search
None
See application file for complete search history.

(56) References Cited

U.S. PATENT DOCUMENTS

2003/0192626 A1* 10/2003 Takiguchi ............... C22C 38/50
                                                         148/405
2007/0113405 A1   5/2007 Reiter

FOREIGN PATENT DOCUMENTS

JP      7-189852 A     7/1995
JP      11-186018 A    7/1999
              (Continued)

OTHER PUBLICATIONS

Machine translation of JP07-189852A. (Year: 1995).*
(Continued)

*Primary Examiner* — Xiaowei Su
(74) *Attorney, Agent, or Firm* — Crowell & Moring LLP (57) ABSTRACT

There is provided a hollow composite magnetic member obtained by partially reforming a hollow member which is formed of a ferromagnetic material containing Cr of 15 mass % or more and 18 mass % or less, in which the reformed portion includes an alloy containing Cr of 8 mass % or more and 18 mass % and Ni of 6.5 mass % or more and 50 mass % or less. Accordingly, a hollow composite magnetic member having a small width of the nonmagnetic portion and a fuel injection valve having the same can be provided.

4 Claims, 4 Drawing Sheets

(51) Int. Cl.
    *B23K 26/12*     (2014.01)
    *B23K 26/34*     (2014.01)
    *B23K 26/00*     (2014.01)
    *B23K 26/211*     (2014.01)
    *B23K 26/08*     (2014.01)
    *B23K 26/342*     (2014.01)
    *B23K 15/00*     (2006.01)
    *B23K 101/00*     (2006.01)
    *B23K 103/04*     (2006.01)
    *B23K 101/06*     (2006.01)

(52) U.S. Cl.
    CPC ........ *B23K 26/0823* (2013.01); *B23K 26/123* (2013.01); *B23K 26/127* (2013.01); *B23K 26/211* (2015.10); *B23K 26/34* (2013.01); *B23K 26/342* (2015.10); *F02M 51/06* (2013.01); *H01F 1/14708* (2013.01); *B23K 2101/006* (2018.08); *B23K 2101/06* (2018.08); *B23K 2103/05* (2018.08); *F02M 2200/08* (2013.01); *F02M 2200/8084* (2013.01); *F02M 2200/9061* (2013.01); *F02M 2200/9069* (2013.01)

(56) References Cited

FOREIGN PATENT DOCUMENTS

| | | |
|---|---|---|
| JP | 11-247737 A | 9/1999 |
| JP | 2001-87875 A | 4/2001 |
| JP | 2001-93717 A | 4/2001 |
| JP | 2007-515586 A | 6/2007 |
| JP | 2014-214351 A | 11/2014 |
| WO | WO 2012/172864 A1 | 12/2012 |

OTHER PUBLICATIONS

International Search Report (PCT/ISA/210) issued in PCT Application No. PCT/JP2016/067169 dated Jul. 12, 2016 with English translation (five pages).

Japanese-language Written Opinion (PCT/ISA/237) issued in PCT Application No. PCT/JP2016/067169 dated Jul. 12, 2016 (six pages).

Hindi-language Office Action issued in Indian Application No. 201717046886 dated Jun. 19, 2020 with English translation (six (6) pages).

\* cited by examiner

HOLLOW COMPOSITE MAGNETIC MEMBER, PROCESS FOR PRODUCING SAME, AND FUEL EJECTION VALVE

TECHNICAL FIELD

The present invention relates to a hollow composite magnetic member, a manufacturing method for the same, and a fuel injection valve.

BACKGROUND ART

In recent years, fuel efficiency regulations of automobiles have been tightened and automobile engines are required low fuel consumption. In order to achieve the low fuel consumption, it is essential for the fuel injection valve to control a small injection amount of fuel. In internal combustion engines of automobiles or the like, electromagnetic fuel injection valves driven by electric signals from an engine control unit are widely used.

The valve has a structure that a solenoid coil is disposed on an outside of a pipe made of a ferromagnetic material, a core and an anchor to which a valve body is attached are disposed inside the pipe and the valve body is urged toward a valve seat side by receiving the force of the spring when the valve is closed. A magnetic circuit is formed around the solenoid coil by an electromagnetic force generated by applying a pulse voltage to the solenoid coil, and the anchor is suctioned to the core. As a result, the valve body is opened by being spaced apart from the valve seat and the fuel is injected from a tip of the fuel injection valve. In order to concentrate magnetic flux on a surface where the anchor and the core face and to generate a suction force in the anchor and the core, a portion of the pipe needs to be made nonmagnetic or weak-magnetic for the purpose of suppressing magnetic flux leakage.

In order to demagnetize or weakly magnetize a portion of the pipe, PTL 1 discloses a method of inserting a nonmagnetic thin plate between two thin ferromagnetic or ferrite thin plates, performing joining of boundary portions of the thin plate by laser welding, bending the thin plate into a sleeve shape after the joining, performing fixation of the boundary portions of the sleeve in the longitudinal direction by laser welding.

In addition, for demagnetization or weak-magnetization of a portion of the pipe, PTL 2 discloses a method of supplying a Ni wire to a laser irradiated location of a magnetic hollow member made of stainless steel.

CITATION LIST

Patent Literature

PTL 1: JP-T-2007-515586
PTL 2: JP-A-2001-87875

SUMMARY OF INVENTION

Technical Problem

However, according to the method described in PTL 1, since there is need to manufacture a plurality of thin plates made of a ferromagnetic material and a nonmagnetic material, combine and join a plurality of thin plates, and then further bend the plurality of thin plates in a sleeve shape and join the plurality of thin plates, It requires many man-hours and it is difficult to manufacture. In addition, in order to achieve miniaturization of an injector, it is necessary to miniaturize the solenoid coil and to reduce the magnetic circuit to be formed. However, according to the method described in PTL 1, since there is a limit in reducing a width of the nonmagnetic portion of the sleeve (pipe), it is difficult to miniaturize the injector.

In addition, since the pure Ni-material has magnetism, demagnetization or weak-magnetization cannot necessarily be achieved by the method described in PTL 2. In order to make a treated portion demagnetized or weakly magnetized, it is necessary to select appropriate treatment conditions and to control the elemental composition of the treated portion and bias of the element concentration.

An object of the present invention is to provide a hollow composite magnetic member having a small nonmagnetic portion width and a fuel injection valve having the hollow composite magnetic member and to manufacture such a hollow composite magnetic member by a simple method.

Solution to Problem

According to the present invention, there is provided a hollow composite magnetic member which is formed of a ferromagnetic material containing Cr of 15 mass % or more and 18 mass % or less, the hollow composite magnetic member including: a reformed portion in a portion thereof, and in which the reformed portion has an alloy containing Cr of 8 mass % or more and 18 mass % and Ni of 6.5 mass % or more and 50 mass % or less.

Advantageous Effects of Invention

According to the present invention, it is possible to provide a hollow composite magnetic member having a small nonmagnetic portion width and a fuel injection valve having the same. In addition, such a hollow composite magnetic member can be manufactured by a simple method.

As a result, a fuel injection valve having high responsiveness to opening and closing of the fuel injection valve with respect to the pulse voltage applied to the electromagnetic coil can be provided and fuel consumption of an automobile on which the fuel injection valve is mounted can be improved.

DESCRIPTION OF EMBODIMENTS

The present invention relates to a pipe which is made of a ferromagnetic material and is locally weakly magnetized, and a fuel injection valve having the same. In other words, the pipe described above is a pipe formed mostly of a ferromagnetic material, a portion of which is weakly magnetized, and can also be referred to as a hollow composite magnetic member. In other words, the hollow composite magnetic member means a hollow ferromagnetic member (ferromagnetic pipe) partially having a weakened magnetic portion.

By using the pipe described above, a small and highly responsive fuel injection valve can be manufactured.

The pipe of the present invention is, for example, as follows.

In the pipe of the present invention, it is preferable that a Ni-containing material is added to a portion of an outer peripheral surface of a pipe made of a ferromagnetic material having a saturated magnetization value of 1.0 T or more at an applied magnetic field of $1.6 \times 10^6$ A/m before reforming while a reformed portion is formed by applying heat from an outside portion to a location where the Ni-containing material is added, and the saturated magnetization value of the reformed portion in the applied magnetic field of $1.6 \times 10^6$ A/m is less than 0.6 T.

It is preferable that the pipe has a mixing portion between the pipe of the ferromagnetic material and the reformed portion and the width of the pipe of a heat treatment portion combined with the reformed portion and the mixing portion in the longitudinal direction is less than 5 mm.

It is preferable that a shape of the Ni-containing material added to a portion of the outer peripheral surface of the pipe is one of a wire, a powder, and a coating film.

In a case where a wire for the Ni-containing material is used, a sectional shape thereof is one of a solid or hollow circle, an ellipse, or a rectangle, and an addition method thereof is that the Ni-containing material wraps around a portion of the outer peripheral surface of the pipe or that the Ni-containing material is continuously supplied to a portion of the outer peripheral surface of the pipe.

In a case where a powder is used for the Ni-containing material, the method of addition thereof is that the powder is supplied to a portion of the outer peripheral surface of the pipe.

In a case where a coating film is used for the Ni-containing material, a coating film is formed in advance on at least a portion of the outer peripheral surface of the pipe.

It is preferable that the supply of heat from the outside portion used for reforming the pipe is performed by one of laser irradiation, electron beam irradiation, or high-frequency induction heating.

Hereinafter, although embodiments of the present invention will be described with reference to the drawings, the present invention is not limited to the embodiments described below.

[Configuration and Operation Principle of Fuel Injection Valve]

Figure 1:
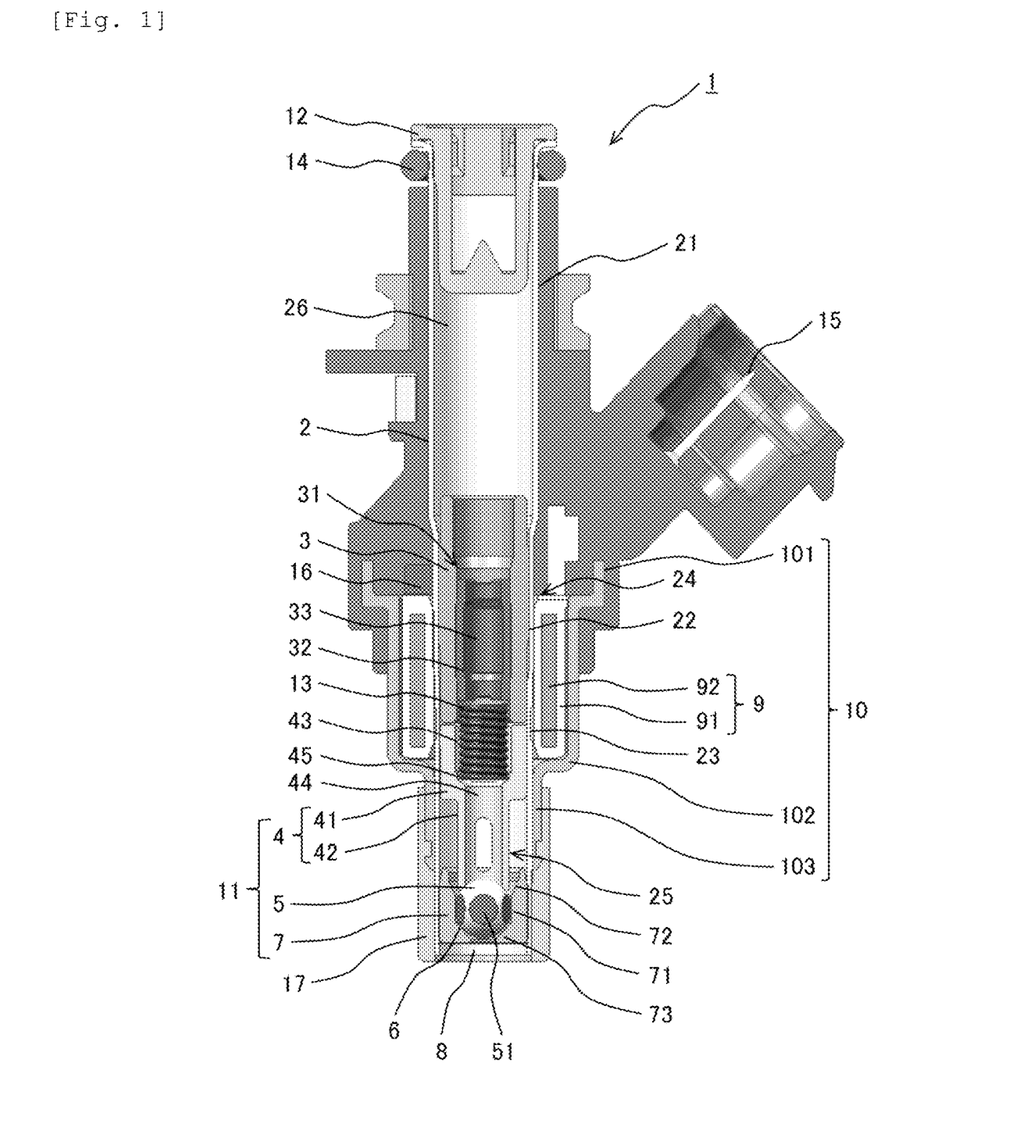
FIG. 1 is a longitudinal sectional view illustrating a fuel injection valve.

FIG. 1 is a longitudinal sectional view illustrating an example of a fuel injection valve.

The fuel injection valve 1 is used for an automobile gasoline engine and is a low-pressure fuel injection valve that injects fuel toward inside the intake manifold. Hereinafter, in FIG. 1, an upper side of the paper surface of the fuel injection valve 1 is referred to as an upstream, and a lower side of the paper surface is referred to as a downstream.

The fuel injection valve 1 includes a pipe 2 which is mainly formed from a ferromagnetic material, a core 3 which is accommodated in the pipe 2, an anchor 4, a valve body 5 which is fixed to the anchor 4, a valve seat member 7 which has a valve seat 6 closed by the valve body 5 when the valve is closed, a nozzle plate 8 which has a fuel injection hole through which fuel is injected when the valve is opened, an electromagnetic coil 9 which operates the valve body 5 in the valve opening direction when being energized, and a yoke 10 which induces magnetic flux lines.

The pipe 2 is made of a metal pipe or the like made of a magnetic metallic material such as electromagnetic stainless steel and is formed in a stepped cylindrical shape as illustrated in FIG. 1 by using means such as press processing such as deep drawing and grinding processing. The pipe 2 has a large diameter portion 21 and a small diameter portion 22 having a smaller diameter than the large diameter portion 21. The pipe 2 has a circular sectional shape.

In the small diameter portion 22, a thin-walled portion 23 which is partially thinned is formed. The small diameter portion 22 is divided into a core accommodation portion 24 which accommodates the core 3 on the upstream side of the thin-walled portion 23 and a valve member accommodation portion 25 which accommodates the valve member 11 including the anchor 4, the valve body 5 and the valve seat member 7 on the downstream side from the thin-walled portion 23. In a state where the core and the anchor 4 are accommodated in the pipe 2, the thin-walled portion 23 is formed so as to surround a gap portion (area where core 3 and anchor 4 face each other) between the core 3 and the anchor 4. The core 3 and the anchor 4 face each other with a gap therebetween. Further, this portion and the inner wall of the pipe 2 face each other, and the thin-walled portion 23 is formed in this location of the pipe 2, and a reformed portion is provided in this portion as described below.

The thin-walled portion 23 increases the magnetic resistance between the core accommodation portion 24 and the valve member accommodation portion 25 and magnetically shields between the core accommodation portion 24 and the valve member accommodation portion 25.

A fuel passage 26 that sends fuel to the valve member 11 is formed in an inside portion of the large diameter portion 21, and a fuel filter 12 for filtering fuel provided on the upstream side of the large diameter portion 21.

The core 3 is formed in a cylindrical shape having a hollow portion 31 and press-fitted into the core accommodation portion 24 of the pipe 2. A spring receiving member 32 fixed by means such as press-fitting is accommodated in the hollow portion 31. At a center of the spring receiving member 32, a fuel passage 33 penetrating in the axial direction is formed.

The anchor 4 is formed by a magnetic member and fixed to the valve body 5 on the downstream side thereof by welding. The anchor 4 has a large diameter portion 41 which has an outer diameter slightly smaller than the inner periphery of the small diameter portion 22 of the pipe 2 on the upstream side thereof and a small diameter portion 42 having a smaller outer diameter than that of the large diameter portion 41.

A spring accommodation portion 43 is formed inside the large diameter portion 41. An inner diameter of the spring accommodation portion 43 is formed to be substantially the same as the inner diameter of the hollow portion 31 of the core 3. A fuel passage hole 44, which is a through hole having a smaller diameter than the inner periphery of the spring accommodation portion 43, is formed in a bottom portion of the spring accommodation portion 43. A spring receiving portion 45 is provided at the bottom portion of the spring accommodation portion 43.

An outer shape of the valve body 5 is substantially spherical, and a fuel passage 51 cut and perforated parallel to the axial direction of the fuel injection valve 1 is provided on the outer peripheral surface thereof.

A substantially conical valve seat 6, a valve body holding hole 71 which is formed substantially at the same diameter as the diameter of the valve body 4 on the upstream side of the valve seat 6, an upstream opening portion 72 which is formed to have a larger diameter toward the upstream side from the valve body holding hole 71, and a downstream opening portion 73 which is opened on the downstream side of the valve seat 6 are formed on the valve seat member 7. The valve seat 6 is formed such that a diameter thereof decreases from the valve body holding hole 71 toward the downstream opening portion 73, and the valve body 5 is seated on the valve seat 6 when the valve is closed. A nozzle plate 8 is welded to the downstream side of the valve seat member 7.

The anchor 4 and the valve body 5 are disposed in the pipe 2 so as to be capable of being operated in the axial direction. A coil spring 13 is provided between the spring receiving portion 45 of the anchor 4 and the spring receiving member 32 to urge the anchor 4 and the valve body 5 toward the downstream side thereof. The valve seat member 7 is inserted into the pipe 2 and fixed to the pipe 2 by welding. An O-ring 14 is provided on the outer periphery of the upstream portion of the pipe 2 for connecting to a pipe of a pump that sends fuel.

An electromagnetic coil 9 is disposed on the outer periphery of the core 3 of the pipe 2. The electromagnetic coil 9 includes a bobbin 91 which is formed of a resin material and a coil 92 which is wound around the bobbin 91. The coil 92 is connected to the electromagnetic coil control device via a connector pin 15.

The yoke 10 has a hollow through hole and includes a large diameter portion 101 which is formed on the upstream side, a medium diameter portion 102 which is formed to be smaller in diameter than the large diameter portion 101, and a small diameter portion 103 which is formed to be smaller in diameter than the medium diameter portion 102 and formed on the downstream side thereof. The small diameter portion 103 is fitted into an outer periphery of the valve member accommodation portion 25. An electromagnetic coil 9 is disposed on the inner peripheral portion of the medium diameter portion 102. A connection core 16 is disposed on the inner periphery of the large diameter portion 101.

The connection core 16 is made of a magnetic metallic material or the like. The large diameter portion 101 and the pipe 2 are connected to each other by the connection core 16. In other words, the yoke 10 is connected to the pipe 2 in the small diameter portion 103 and the large diameter portion 101, and magnetically connected to the pipe 2 at both end portions of the electromagnetic coil 9. A protector 17 for protecting the tip of the pipe 2 is attached to the downstream side of the yoke 10.

When power is supplied to the electromagnetic coil 9 via the connector pin 15, a magnetic field is generated, and the anchor 4 and the valve body 5 are opened against the urging force of the coil spring 13 by the magnetic force of this magnetic field. Accordingly, the fuel supplied from the pump is injected into a combustion chamber of the engine.

[Reforming Method]

A manufacturing method of a pipe includes a step of applying a Ni-containing material to a ferromagnetic material, and a step of supplying heat to the Ni-containing material to form a reformed portion.

FIG. 2A to FIG. 3B schematically illustrate an apparatus configuration in which a reformed portion is provided in a portion of a pipe made of a ferromagnetic material containing Cr of 15 mass % or more and 18 mass % or less.

Figure 2A:
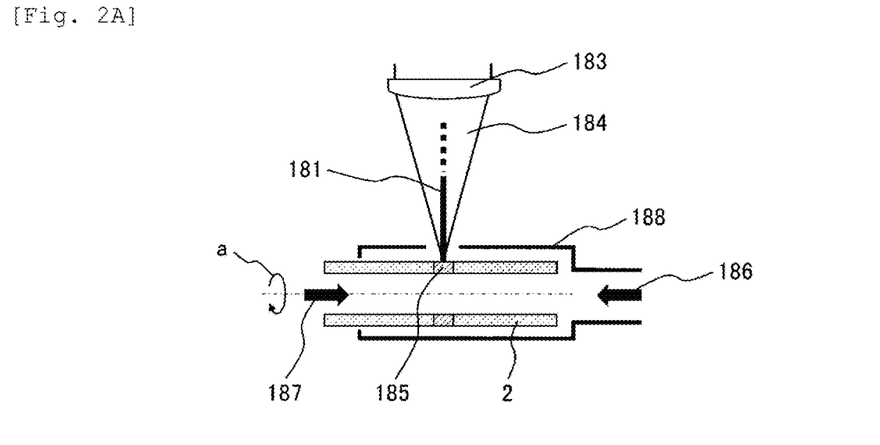
FIG. 2A is a longitudinal sectional view illustrating a configuration of a pipe reforming apparatus in Examples 1 and 3.
Figure 2B:
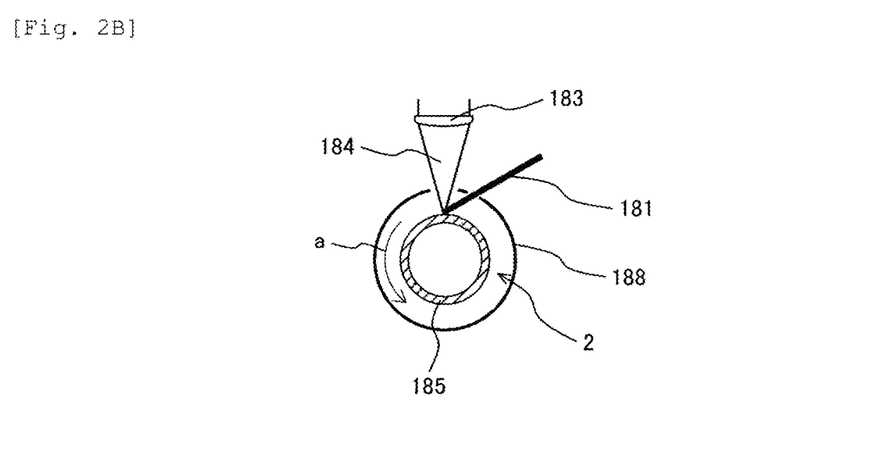
FIG. 2B is a sectional view of FIG. 2A.

FIG. 2A is a longitudinal sectional view illustrating an apparatus configuration for supplying a wire to a pipe and irradiating a laser beam. In addition, FIG. 2B is a transverse sectional view thereof.

Figure 3A:
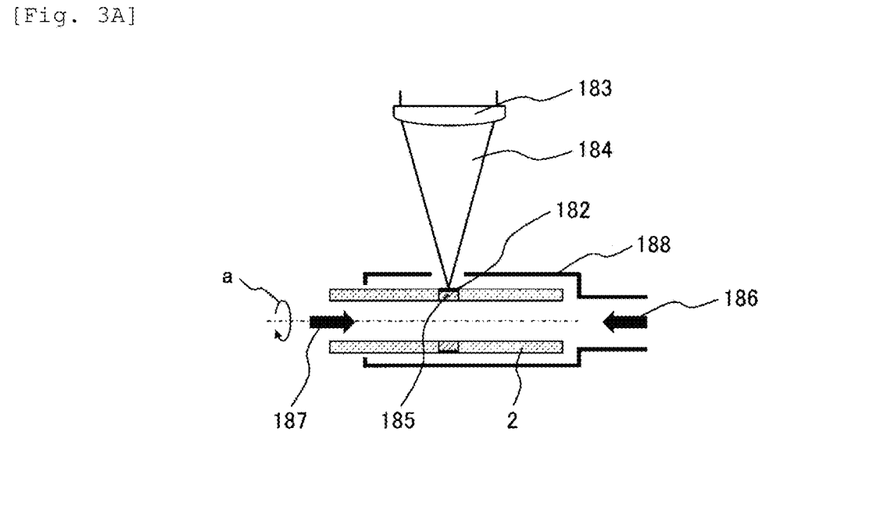
FIG. 3A is a longitudinal sectional view illustrating a configuration of a pipe reforming apparatus in Examples 2 and 4.
Figure 3B:
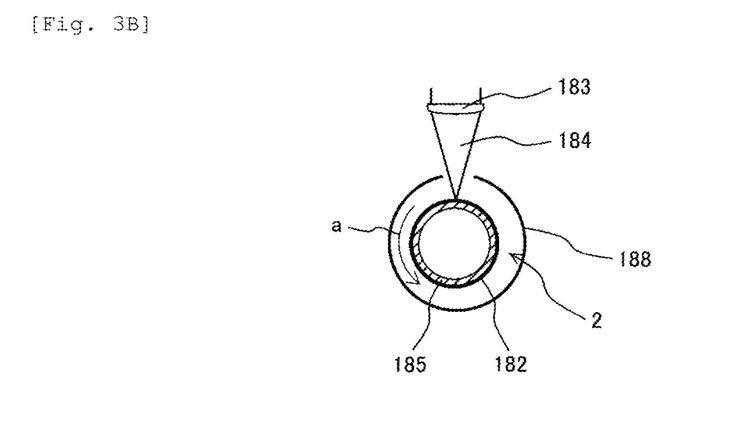
FIG. 3B is a sectional view of FIG. 3A.

FIG. 3A is a longitudinal sectional view illustrating an apparatus configuration for irradiating a laser beam in a state where a wire is wound around a pipe in advance. In addition, FIG. 3B is a transverse sectional view thereof.

First, an outline of the apparatus configuration will be described with reference to FIG. 2A and FIG. 2B.

As illustrated in FIG. 2A, the apparatus includes a condenser lens 183 which adjusts the diameter of a laser beam transmitted from a laser oscillator through a fiber, and a treatment portion shielding jig 188. The treatment portion shielding jig 188 has a through hole through which the laser beam 184 can be irradiated to the pipe 2. In addition, the wire 181 is inserted into the through hole so that the wire 181 can be brought into contact with the pipe 2. In addition, the pipe 2 is installed so as to be able to rotate in the direction indicated by the reference sign a. Shielding gases 186 and 187 can be supplied to the treatment portion shielding jig 188 and the inside portion of the pipe 2.

When the reformed portion 185 is formed on the pipe 2, the shielding gases 186 and 187 are supplied, the wire 181 is brought into contact with the pipe 2, the laser beam 184 is irradiated while the pipe 2 is rotated, and the wire 181 is welded to the pipe 2. Accordingly, the reformed portion 185 which is weakly magnetized can be formed in a portion of the pipe 2. It is preferable that the reformed portion 185 is smaller in thickness (thinner) than the other portions of the pipe 2.

For example, laser irradiation (fiber laser having a wavelength of 1070 nm) can be used as a method of supplying heat from the outside. A circular laser beam transmitted from a laser oscillator through a fiber having a fiber core diameter of 0.1 mm is irradiated onto the outer peripheral surface of the pipe 2 via a condenser lens 183 with a laser beam 184. A cylindrical lens is used for the condenser lens 183, and the laser beam 184 at the focal position is transformed so that the shape thereof is linear (width 5 mm, depth 0.2 mm). The out-of-focus distance of the laser beam 184 with respect to the outer peripheral surface (reformed portion) of the pipe 2 is 0 mm, and the laser beam is illuminated on the outer peripheral surface of the pipe 2 so that a width direction of the laser beam 184 at the focal position is parallel to the longitudinal direction of the pipe 2.

During the irradiation of the outer peripheral surface of the pipe 2 with the laser beam 184, a pipe outer peripheral surface shielding gas 186 and a pipe inner peripheral surface shielding gas 187 are used for preventing oxidation of the reformed portion 185. Shield gas types are all $N_2$. In order to make effective the shielding on both the outer peripheral surface side and the inner peripheral surface side of the reformed portion 185 of the pipe 2, the treatment portion shielding jig 188 is used.

As a heat supply method from the outside, for example, electron beam irradiation or high-frequency induction heating can be used other than laser irradiation.

In FIG. 2A and FIG. 2B, the pipe 2 is rotated at a predetermined speed in the direction of the reference sign a, the wire 181 is continuously supplied to the outer peripheral surface of the pipe 2 at a predetermined speed, laser beam 184 is irradiated to the wire 181 and the outer peripheral surface of the pipe 2 while the predetermined amount of the pipe outer peripheral surface shielding gas 186 and the pipe inner peripheral surface shielding gas 187 flow, and the reformed portion 185 is formed.

In FIG. 3A and FIG. 3B, a wire 182 is wrapped around the outer peripheral surface of the pipe 2 in advance to perform temporary fixing and then the pipe 2 is rotated at a predetermined speed in the direction of the reference sign a, laser beam 184 is irradiated to the wire 181 and the outer peripheral surface of the pipe 2 while the predetermined amount of the pipe outer peripheral surface shielding gas 186 and the pipe inner peripheral surface shielding gas 187 flow, and the a reformed portion 185 is formed.

The pipe 2 is made of ferrite stainless steel which is a ferromagnetic material. It is desirable that the composition of the pipe 2 has Cr of 15 mass % or more and 18 mass % or less in addition to Fe. As such a metal, for example, Cr of 16.49 mass %, Si of 0.44 mass %, Ni of 0.19 mass %, C of 0.01 mass % and Mn of 0.25 mass % are contained.

The thin-walled portion 23 (illustrated in FIG. 1) on the outer peripheral surface of the pipe 2 is modified by adding a Ni-containing material. The Ni-containing material can be reformed by applying to a location to be modified and supplying heat. A step of applying the Ni-containing material to a location to be reformed and a step of supplying heat may be performed simultaneously or separately.

As the Ni-containing material, for example, a pure Ni-material can be used. Another example is an austenitic stainless steel such as JIS SUS 310 S steel or JIS SUS 316 steel, for example.

As the shape of the Ni-containing material, for example, the wire 181 with a circular solid sectional shape as illustrated in FIG. 2A and FIG. 2B and a wire 182 with a rectangular solid sectional shape as illustrated in FIG. 3A and FIG. 3B can be used. As a Ni-containing material having another shape, for example, powdery or coating film-like material can be used. Examples of the coating film-like material include, for example, an electroplated film and a cold spray film. As the cold spray film, there is a film formed by a method in which a gas and a metal of 1 to 50 μm, an alloy or a polymer or a mixture thereof are sprayed at a high speed of 300 to 1200 m/s as a jet.

Although the wire has an advantage that it is easier to add to the reformed portion 185 as Compared to other forms of Ni-containing material, there is a limit to the selection of additional elements. Compared to other forms of Ni-containing materials, in the powders, although there are infinite combinations of compounding concentration and compounding components and additive elements and concentrations can be arbitrarily selected, the addition efficiency is poor and the cost further increases. Compared to other Ni-containing materials, in the coating film, as in the powders, there are infinite combinations of compounding concentration and compounding components and additive elements and concentrations can be arbitrarily selected. However, among the coating films, in the plating film, there is a problem in the adhesion to the base material (pipe 2 in the present invention), there is also a problem in uniformity of the film thickness in the cold spray film, and there is disadvantage in terms of uniformity of the reforming of the heat supply portion.

In a case where a wire is used for the Ni-containing material, a sectional shape thereof can be one of a solid or hollow circle, an ellipse, a rectangle, or the like.

From the viewpoint of wire production, the sectional shape of the wire is generally a solid circle or a rectangle, which is likely to be obtained. In particular, a solid circle is general and the cost can be reduced most. From the viewpoint of addition to the reformed portion 185, it is easiest to add with a solid circle. The hollow circle is disadvantageous in terms of the uniformity of the reformed portion at the time of addition. Warpage is more likely to occur in a rectangle than in a solid circle. Therefore, in a solid circle, addition by wire supplying is a preferable method, and in a rectangular shape, addition by wire winding on a pipe 2 is a preferable method.

In addition, in a case where a powdery material is used as the Ni-containing material, a sectional shape thereof is either solid or hollow, and an addition method thereof is characterized in that the powdery material is supplied to a portion of the outer peripheral surface of the pipe.

From the viewpoint of powder production, solid powder is common as well as wire, and it is likely to be obtained. Also from the viewpoint of addition to the reformed portion 185, the solid is more stable than the hollow, and porosity is less likely to occur in the reformed portion 185.

In a case where a coating film is used for the Ni-containing material, the coating film is formed in advance on at least a portion of the outer peripheral surface of the pipe. In a step of applying the Ni-containing material to the ferromagnetic material, the coating film is formed on at least a portion of the outer peripheral surface of the pipe. After the coating film is formed, heat can be supplied by a laser or the like to form a reformed portion.

The coating film can be formed by an electroplating method, a cold spray method, or the like.

In any of these methods, since a member having Ni is applied only to a range to be reformed and laser irradiation is carried out, in a case where this reforming method is used, in a heat treatment portion including a mixing portion which includes a reformed portion of the pipe and a heat affected portion around the pipe, the width of the pipe in the longitudinal direction can be less than 5 mm. The range of the reformed portion can be minimized and a pipe having a small nonmagnetic portion width can be manufactured.

[Evaluation Method of Saturated Magnetization and Element Concentration]

Figure 4:
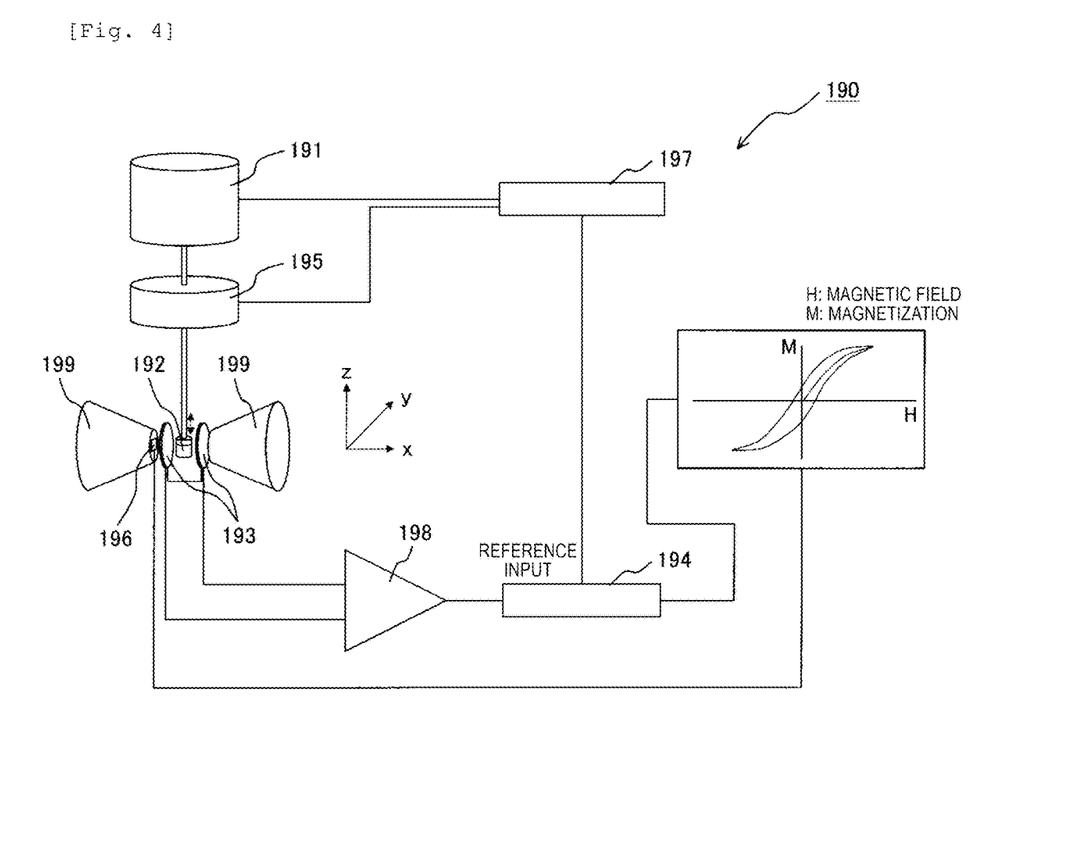
FIG. 4 is a principle diagram of a sample vibration type magnetometer.

FIG. 4 is a principle diagram of a sample vibration type magnetometer 190 (hereinafter referred to as vibration sample magnetometer (VSM)) used for evaluating the saturated magnetization in the present embodiment.

In the VSM, by using the oscillator 191 to vibrate the sample 192 with a small amplitude, a time change of magnetic flux generated by the magnetization of the sample is detected as an induced electromotive force by a detection coil 193 in the vicinity of the sample, and the magnetization of the sample can be measured from the induced electromotive force thereof. Since the induced electromotive force is weak, magnetization can be measured with high sensitivity by passing through a lock-in amplifier 194.

The saturated magnetization value is obtained by cutting out the reformed portion 185 of the pipe 2 illustrated in FIG. 2A or the like, measuring a magnetization curve of the reformed portion 185 using the VSM, as the magnetization value when the magnetic field is $1.6 \times 10^6$ A/m. The saturated magnetization value of the pipe 2 before reforming is 1.6 T. The saturated magnetization value can be made less than 0.6 T by the reforming treatment.

The element concentration is evaluated by cutting the reformed portion 185 so as to obtain a cross section of the reformed portion 185 along the longitudinal direction of the pipe 2 and using energy dispersive X-ray spectroscopy attached to the scanning electron microscope. The element concentration is obtained by analyzing the concentrations of Cr and Ni at five arbitrarily selected areas of 100 μm square in the cross section of the reformed portion 185. For example, it is preferable that the standard deviation of Cr concentration is 1 or less and the standard deviation of Ni concentration is 5 or less for five areas divided into 100 μm square in the cross section and arbitrarily selected in the reformed portion. In a case where the weak-magnetization of the reformed portion 185 is properly performed, the Cr concentration and the Ni concentration are about 10 mass % and about 30 to 50 mass %, respectively. The deviation of the element concentration of the reformed portion 185 affects the magnetic characteristics of the reformed portion 185. Therefore, in order that the magnetic characteristics of the reformed portion are uniform, it is preferable to suppress the standard deviation of each element to about 1/10 or less of the concentration of each element, and therefore the standard deviation of Cr concentration and Ni concentration are preferably 1 or less and 5 or less, respectively.

[Organization Diagram of Stainless Steel]

Figure 5:
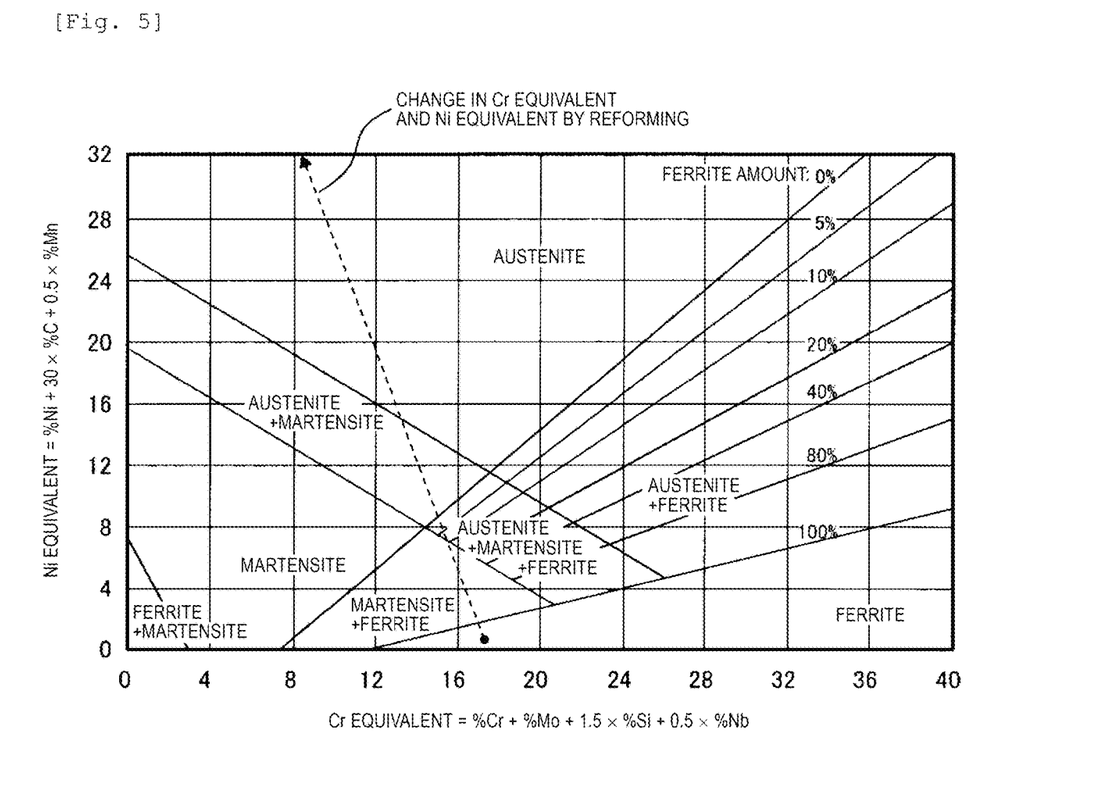
FIG. 5 is a Schaeffer's diagram.

FIG. 5 is a Schaeffer's diagram which is one of organization diagrams of stainless steel. From a relationship between the Cr equivalent and the Ni equivalent in the Schaeffer's diagram, it is possible to predict the material organization for the element concentration of Cr and Ni in the reformed portion 185 can be predicted.

In the ferrite stainless steel used in the present embodiment, the Cr equivalent is 17.15 and the Ni equivalent is 0.615. when the dilution of constituent elements of ferrite stainless steel by addition of Ni is considered, the appearance of an austenite organization which is a weakly magnetized organization due to reforming is recognized in a case where the Ni concentration in the reformed portion 185 is 6.5 mass % or more. In addition, from the results of Examples and Comparative Examples described below, the Ni concentration of the reformed portion 185 should not exceed 50 mass % for weak-magnetization. In the reformed portion 185, when the Ni concentration is 50 mass %, the Cr concentration is 8 mass %. Furthermore, the Cr concentration of the austenitic stainless steel which is a nonmagnetic material is about 18 mass %. In consideration of the above, in the present invention, the concentration ranges of Cr and Ni are limited.

Hereinafter, examples will be described.

Example 1

As illustrated in FIG. 2A and FIG. 2B, the pipe 2 is rotated in a direction of a, and a laser beam 184 is irradiated to the outer peripheral surface of the pipe 2 and the wire 181 to form a reformed portion, while supplying and adding a wire 181 with a circular solid sectional shape which is made of a pure Ni-material to the thin-walled portion 23 (illustrated in FIG. 1) on the outer peripheral surface of the pipe 2. The output of the laser beam 184 is set to 940 W, the rotation speed of the pipe 2 is set to 1500 mm/min, the supplying speed of the wire 181 is set to 800 mm/min, the supplying time of the wire 181 is set to 861 msec, the irradiation time of the laser beam 184 is set to 1076 msec, the flow rate of the pipe outer peripheral surface shielding gas 186 is set to 20 L/min, and the flow rate of the pipe inner peripheral surface shielding gas 187 is set to 10 L/min and the reforming is performed. Only the reformed portion 185 is cut and the saturated magnetization value is measured and then found to be 0.09 T. In addition, the average value of the element concentration in the cross section of the reformed portion 185 along the longitudinal direction of the pipe 2 is Cr of 10.2 mass % and Ni of 38.5 mass %. In addition, the standard deviation of the element concentration is Cr of 0.171 and Ni of 1.03.

According to this example, it is possible to reduce the saturated magnetization value by about 94% with respect to before the reforming, and further the variation in the element concentrations of Cr and Ni within the reformed portion 185 becomes small. The saturated magnetization value can be stably reduced irrespective of the location in the reformed portion 185. In other words, it is possible to easily weakly magnetize the local portion of the pipe 2 made of a ferromagnetic material with fewer man-hours. In addition, in a case where the pipe 2 obtained in this example is mounted on the fuel injection valve 1, it contributes to miniaturization of the fuel injection valve 1 and improvement of responsiveness of opening and closing of the fuel injection valve 1, and furthermore, can be contributed to the improvement of fuel consumption of an automobile on which the fuel injection valve 1 is mounted.

Example 2

As illustrated in FIG. 3A and FIG. 3B, a wire 182 with a rectangular solid sectional shape which is made of a pure Ni-material is wound around the outer peripheral surface of the pipe 2 in advance and fixed temporarily, and then the pipe 2 is rotated in the direction of a, and a laser beam 184 is irradiated to the outer peripheral surface of the pipe 2 around which the wire 182 is wound to form a reformed portion. The output of the laser beam 184 is set to 800 W, the rotation speed of the pipe 2 is set to 1953 mm/min, the irradiation time of the laser beam 184 is set to 1359 msec, the flow rate of the pipe outer peripheral surface shielding gas 186 is set to 20 L/min, and the flow rate of the pipe inner peripheral surface shielding gas 187 is set to 10 L/min and the reforming is performed. Only the reformed portion 185 is cut and the saturated magnetization value is measured and then found to be 0.51 T. In addition, the average value of the element concentration of the cross section of the reformed portion 185 along the longitudinal direction of the pipe 2 is Cr of 9.98 mass % and Ni of 35.1 mass %. In addition, the standard deviation of the element concentration is Cr of 0.565 and Ni of 3.06.

According to this example, it is possible to reduce the saturated magnetization value by about 68% with respect to before the reforming, and further, the variation in the element concentration of Cr and Ni within the reformed portion 185 becomes small. The saturated magnetization value can be stably reduced irrespective of the location in the reformed portion 185. In other words, it is possible to easily weakly magnetize the local portion of the pipe 2 made of a ferromagnetic material with fewer man-hours. In addition, in a case where the pipe 2 obtained in this example is mounted on the fuel injection valve 1, it contributes to miniaturization of the fuel injection valve 1 and improvement of responsiveness of opening and closing of the fuel injection valve 1, and furthermore, can be contributed to the improvement of fuel consumption of an automobile on which the fuel injection valve 1 is mounted.

Example 3

As illustrated in FIG. 2A and FIG. 2B, the pipe 2 is rotated in a direction of a, and a laser beam 184 is irradiated to the outer peripheral surface of the pipe 2 and the wire 181 to form a reformed portion, while supplying and adding a wire 181 with a circular solid sectional shape which is made of a pure Ni-material to the thin-walled portion 23 (illustrated in FIG. 1) on the outer peripheral surface of the pipe 2. The output of the laser beam 184 is set to 930 W, the rotation speed of the pipe 2 is set to 1500 mm/min, the supplying speed of the wire 181 is set to 700 mm/min, the supplying time of the wire 181 is set to 861 msec, the irradiation time of the laser beam 184 is set to 1076 msec, the flow rate of the pipe outer peripheral surface shielding gas 186 is set to 20 L/min, and the flow rate of the pipe inner peripheral surface shielding gas 187 is set to 10 L/min and the reforming is performed. Only the reformed portion 185 is cut and the saturated magnetization value is measured and then found to be 0.63 T. In addition, the average value of the element concentration in the cross section of the reformed portion 185 along the longitudinal direction of the pipe 2 is Cr of 11.6 mass % and Ni of 29.9 mass %. In addition, the standard deviation of the element concentration is Cr of 2.64 and Ni of 16.0.

According to this example, the reduction rate of the saturated magnetization value with respect to the before the reforming is about 61%. Compared to Example 1, it can be seen that the variation in the reformed portion 185 of in the element concentrations of Cr and Ni is large, and the saturated magnetization value varies depending on the location in the reformed portion 185. However, compared to the method of the related art, a pipe having a small nonmagnetic portion width and a fuel injection valve mounting the main pipe can be provided. In addition, the pipe and the fuel injection valve can be manufactured by a simpler method than that of the related art.

Example 4

As illustrated in FIG. 3A and FIG. 3B, a wire 182 with a rectangular solid sectional shape which is made of a pure Ni-material is wound around the outer peripheral surface of the pipe 2 in advance and fixed temporarily, and then the pipe 2 is rotated in the direction of a, and a laser beam 184 is irradiated to the outer peripheral surface of the pipe 2 around which the wire 182 is wound to form a reformed portion. The output of the laser beam 184 is set to 700 W, the rotation speed of the pipe 2 is set to 2500 mm/min, the irradiation time of the laser beam 184 is set to 1060 msec, the flow rate of the pipe outer peripheral surface shielding gas 186 is set to 20 L/min, and the flow rate of the pipe inner peripheral surface shielding gas 187 is set to 10 L/min and the reforming is performed. Only the reformed portion 185 is cut and the saturated magnetization value is measured and then found to be 1.01 T. In addition, the average value of the element concentration of the cross section of the reformed portion 185 along the longitudinal direction of the pipe 2 is Cr of 10.7 mass % and Ni of 29.0 mass %. In addition, the standard deviation of the element concentration is Cr of 4.50 and Ni of 25.3.

According to this example, the reduction rate of the saturated magnetization value with respect to before the reforming is about 37%. Compared to Example 2, the variation in the reformed portion 185 of the element concentrations of Cr and Ni became large. However, compared to the method of the related art, a pipe having a small nonmagnetic portion width and a fuel injection valve mounting the main pipe can be provided. In addition, the pipe and the fuel injection valve can be manufactured by a simpler method than that of the related art.

Table 1 summarizes the results of Examples 1 to 4.

TABLE 1

|  | Example 1 | | Example 2 | | Example 3 | | Example 4 | |
| --- | --- | --- | --- | --- | --- | --- | --- | --- |
| Saturated magnetization (T) | 0.09 | | 0.51 | | 0.63 | | 1.01 | |
| Element concentration (mass %) | Cr | Ni | Cr | Ni | Cr | Ni | Cr | Ni |
|  | 10.2 | 38.0 | 10.5 | 31.1 | 14.4 | 13.1 | 15.4 | 0.400 |
|  | 10.2 | 38.5 | 10.2 | 35.7 | 9.83 | 40.5 | 8.29 | 42.9 |
|  | 10.3 | 37.6 | 9.61 | 40.2 | 7.86 | 52.4 | 3.60 | 68.5 |
|  | 9.83 | 40.5 | 9.04 | 33.1 | 11.1 | 32.7 | 10.7 | 29.6 |
|  | 10.3 | 38.0 | 10.5 | 35.5 | 14.8 | 10.7 | 15.4 | 3.72 |
| Average | 10.2 | 38.5 | 9.98 | 35.1 | 11.6 | 29.9 | 10.7 | 29.0 |
| Standard Deviation | 0.171 | 1.03 | 0.565 | 3.06 | 2.64 | 16.0 | 4.50 | 25.3 |

REFERENCE SIGNS LIST

1: fuel injection valve, 2: pipe, 3: core, 4: anchor, 5: valve body, 6: valve seat, 7: valve seat member, 8: nozzle plate, 9: electromagnetic coil, 10: yoke, 11: valve member, 12: fuel filter, 13: coil spring, 14: O-ring, 15: connector pin, 16: connection core, 17: protector, 21: large diameter portion (of pipe), 22: small diameter portion (of pipe), 23: thin-walled portion, 24: core accommodation portion, 25: valve member accommodation portion, 26: fuel passage (of pipe), 31: hollow portion (of core), 32: spring receiving member, 33: fuel passage (of core), 41: large diameter portion (of anchor), 42: small diameter portion (of anchor), 43: spring accommodation portion, 44: fuel passage hole (of anchor), 45: spring receiving portion (of anchor), 51: fuel passage (of valve body), 71: valve body holding hole, 72: upstream opening portion, 73: downstream opening portion, 91: bobbin, 92: coil, 101: large diameter portion (of yoke), 102: medium diameter portion (of yoke), 103: small diameter portion (of yoke), 181: wire with circular solid sectional shape, 182: wire with rectangular solid sectional shape, 183: condensing lens, 184: laser beam, 185: reformed portion, 186: pipe outer peripheral surface shielding gas, 187: pipe inner peripheral surface shielding gas, 188: treatment portion shielding jig, 190: sample vibration type magnetometer, 191: oscillator, 192: sample, 193: detection coil, 194: lock-in amplifier, 195: amplitude sensor, 196: magnetic field sensor, 197: vibration control, 198: preamplifier, 199: magnet.

The invention claimed is:

1. A device comprising:
   a hollow composite magnetic member which is formed of
      a ferromagnetic material containing Cr, wherein
         the hollow composite magnetic member includes a reformed portion in a portion thereof,
         the reformed portion includes an alloy containing Cr of 8 mass % or more and 18 mass % or less and Ni of 35.1 mass % or more and 50 mass % or less, and
         at an applied magnetic field of $1.6 \times 10^6$ A/m: i) a saturated magnetization value of the ferromagnetic material is at least 1.0 T, and ii) a saturated magnetization value of the reformed portion is less than 0.6 T.

2. The device according to claim 1,
wherein the hollow composite magnetic member has a pipe shape of which a cross-sectional shape is a circular shape.

3. The device according to claim 1,
wherein the reformed portion has a characteristic in which a standard deviation of the concentration of Cr is 1 or less and a standard deviation of the concentration of Ni is 5 or less with respect to standard deviations of the concentrations of Cr and Ni in five areas of 100 μm square arbitrarily selected in the cross section.

4. The device according to claim 3,
wherein a mixing portion generated by the influence of heat is provided on a portion adjacent to the reformed portion, and
wherein the width of the heat treatment portion including the reformed portion and the mixing portion in the longitudinal direction is less than 5 mm.

* * * * *